United States Patent [19]

Kubo et al.

[11] 3,871,894

[45] Mar. 18, 1975

[54] COATED CHROMATE PIGMENT COMPOSITIONS AND PROCESS FOR PRODUCING THE SAME

[75] Inventors: Shigenaga Kubo, Tokyo; Nobuyoshi Abe, Saitama, both of Japan

[73] Assignee: Nippon Chemical Industrial Co., Ltd., Tokyo, Japan

[22] Filed: May 17, 1973

[21] Appl. No.: 361,084

[30] Foreign Application Priority Data

May 18, 1972 Japan............................ 47-48532
May 19, 1972 Japan............................ 47-49201
June 7, 1972 Japan............................ 47-56088

[52] U.S. Cl................. 106/302, 106/298, 106/299, 106/303
[51] Int. Cl......... C09c 1/08, C09c 1/20, C09c 1/34
[58] Field of Search ............ 106/298, 302, 303, 299

[56] References Cited
UNITED STATES PATENTS

| | | | |
|---|---|---|---|
| 2,212,917 | 8/1940 | Horning............................ | 106/298 |
| 3,046,150 | 7/1962 | Jamieson ............................ | 106/302 |
| 3,053,685 | 9/1962 | Jamieson ............................ | 106/302 |
| 3,080,248 | 3/1963 | Wilke et al. ........................ | 106/302 |
| 3,434,857 | 3/1969 | Seelig................................ | 106/303 |
| 3,639,133 | 2/1972 | Linton ............................... | 106/298 |
| 3,690,906 | 9/1972 | Buckley et al. ..................... | 106/302 |

*Primary Examiner*—C. Davis
*Attorney, Agent, or Firm*—Sughrue, Rothwell, Mion, Zinn & Macpeak

[57] ABSTRACT

A chromate pigment having a zirconium coating thereon. Modifications include a further silica or antimony coating. The pigments illustrate superior heat, light, chemical, etc., resistance.

The basic zirconium-coated pigment is produced by adding a dilute aqueous solution of a zirconium salt to an aqueous slurry of chromate pigment particles to deposit zirconium hydroxide on the surface of the particles. If the zirconium-coated pigment is to be used per se, it is filtered and dehydrated to increase the bonding of the zirconium compound to the pigment. If silica coating is to be conducted, following the dehydration the zirconium coated chromate pigment is redispersed in water and the silica deposited thereon. If antimony is to be deposited, the zirconium-coated pigment need not be dehydrated but, rather, after free water removal the product is redispersed in water and then the antimony compound deposited thereon.

Necessary proportions and conditions for the products and processes are set out in the specification.

19 Claims, No Drawings

COATED CHROMATE PIGMENT COMPOSITIONS AND PROCESS FOR PRODUCING THE SAME

BACKGROUND OF THE INVENTION

1. Field of the Invention

The present invention relates to an improved chromate pigment compositions having excellent properties of chemical resistance, weathering resistance, heat resistance, etc., and processes for producing the same.

More particularly, it broadly relates to a pigment composition of a zirconium zirconium-silica or zirconium-antimony coated chromate having deposited on the surface of chromate pigment particles a zirconium compound in an amount less than about 20 percent by weight (calculated as $ZrO_2$) based on the total amount of the composition, and the process for producing the same.

Also, of the chromate pigments, the present invention particularly relates to an improved pigment composition of lead chromate, and to processes for producing the same.

2. Description of the Prior Art

Chromate pigments are used for paints, printing inks or the coloring of synthetic resins and the like due to their distinct, greenish-yellow to orange-red hue and their great hiding or covering power.

Of these, lead chromate is known as a typical one. Also, zinc chromate, strontium chromate, calcium chromate, and the like are famous as a rust-inhibiting pigment and are used in general for a subbing paint.

However, the chromate pigments have the fault that their distinct hue is seriously faded or discolored when exposed to acid, alkali or sulfide in the atmosphere, such as hydrogen sulfide. Further, the hue is similarly faded or discolored when they are exposed to heat or ultraviolet rays. This phenomenon is attributed to the dissolution or reduction of chromate ions, i.e., due to the release of part of the oxygen atoms, and is a serious fault of the chromate pigments.

Also, if the solubility of the rust-inhibiting pigment is great, the rust-inhibiting effect thereof does not last long. Therefore, chromate ion should preferably show gentle or moderate solubility over a long period of time.

Therefore, in the case of using lead chromate pigment as, e.g., a coloring agent for synthetic resins such as polyethylene, polypropylene, polystyrene, ABS, etc., fading or discoloration of the pigment is unavoidable during molding since most of these thermoplastic resins are molded at an elevated temperature, e.g., above 200°C.

Furthermore, these pigments have the defect that they react with fats and oils, synthetic resins, etc., used as a medium for paints or inks, to increase the viscosity to such an extent that in the end gelation or a like phenomenon occurs, which seriously limits the applicable field of use of the pigments.

For the reasons described above, several processes for improving the resistance of the chromate pigments to the conditions listed above by surface treating the pigments are used to modify the chromate pigment particles.

In one such process, lead chromate particles are coated with alumina to impart durability thereto. In this process, sodium aluminate, aluminum sulate or the like is added to chromate pigment particles suspended in water to coat an aluminum sol uniformly on the particle surface at a predetermined pH. However, the alumina coated chrommate pigments obtained by this process do not exhibit a sufficient improvement due to poor coating strength.

The alumina coating is considered to be formed on the surface of the pigment particles with a

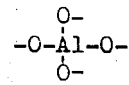

structure where oxygen atoms are in the form of a tetrahedral coordination structure. The coating has the tendency to form a salt with $Na^+$ or like metal ions to neutralize the electric charge or to assume a neutralized state, thus becoming stable. In fact, the alumina coating is liable to react with $Na^+$ and resin to form a metallic soap. Therefore, it is often observed that the viscosity increases to such a degree that in some cases gelation is caused. In particular, such a coating causes serious second agglomeration between particles. When such an alumina coated pigment is used as a paint, this agglomeration causes a reduction in the gloss of the coating film and deteriorates the adhesion thereof to the material to be coated. Thus, there are still many problems which are not solved by alumina coating.

On the other hand, since silica-coating seriously reduces the rust-inhibiting effect of the rust-inhibiting pigment, such as zinc chromate, strontium chromate, calcium chromate, etc., silica-coating cannot be applied to these pigments.

As another process, there is one wherein antimony is directly coated on the surface of chromate pigment. This processing can markedly improve the weathering resistance. However, as to the pigments such as lead chromate, other resistances are not improved so much by this processing. For example, it cannot be expected to improve heat resistance, sulfide resistance, and the like.

On the other hand, this processing has not been applied to rust-inhibiting pigments, nor has the rust-inhibiting effect been improved by the direct processing with antimony.

In recent years, where rust-inhibiting pigment is used together with other general pigment, a process of so-called "one-coating" wherein no undercoating is effected has been employed. Therefore, even rust-inhibiting pigments are required to be capable of improving various resistances without deteriorating the inherent rust-inhibiting action when used for surface treatment.

Another process comprises coating silica or silica-alumina on the surface of the chromate pigment, usually lead chromate. In this process, an aqueous slurry of pigment particles is adjusted to a predetermined pH, and a previously prepared silica sol or alkali silicate aqueous solution is added thereto to form a coating film of silica sol on the surface of the particles, and, in addition, if necessary, alumina sol may be applied to the silica-coated pigment.

The lead chromate pigment modified by such process has fairly improved heat resistance, chemical resistance, etc. However, since the bonding strength between the surface of the particles and the coating film is not sufficient in this coating, there exists a limitation upon use. In addition, the pigment particles have the unfavorable property that they are poor in dispersability in a medium and aggregate with each other. Therefore, strong mechanical shear by means of a dispersing machine is required to disperse the pigment particles in a medium. As a result, however, the coating film of silica is broken or separated from the surface of the pigment particles, which results in a serious reduction in coating effects.

In addition, coating with antimony oxide is also known. However, the effects of improving the properties are not sufficient.

As is described above, processes of coating alumina or silica directly on the surface of chromate pigment particles do not modify the pigment particles to a sufficient degree due to the poor coating strength and are accompanied by serious faults.

SUMMARY OF THE INVENTION

As a result of studying modifications of particles of chromate pigments, in particular, lead chromate pigments, for years, the inventors found that pigment particles of lead chromate having on the surface thereof a coating film of a zirconium compound can be efficiently coated due to an extremely strong bonding force.

The present invention thus broadly relates to a pigment composition of zirconium-coated chromate having deposited on the surface of chromate pigment particles a zirconium compound in an amount less than about 20 percent by weight (calculated as $ZrO_2$) based on the total amount of the composition, in particular, to a pigment composition of zirconium-coated lead chromate.

The present invention further relates to a pigment composition of zirconium- and antimony-coated chromate having deposited on the surface of chromate pigment particles a zirconium compound in an amount less than about 10% by weight (calculated as $ZrO_2$) based on the total amount of the composition and on this zirconium film 1 – 10 percent by weight of a water-insoluble antimony compound (calculated as $Sb_2O_3$).

As a result of their studies the inventors also found that pigment particles of (lead) chromate having on the surface thereof a coating film of a zirconium compound prior to the application of a silica film can form an extremely strong coating film.

This modified pigment of the present invention is a pigment composition of zirconium-silica-coated (lead) chromate having on the surface of lead chromate pigment particles a zirconium compound in an amount less than about 20 percent by weight (calculated as $ZrO_2$) based on the total amount of the composition and 3 – 40 percent by weight of an amorphous silica film on this zirconium film. In addition, the present invention relates to processes for producing the above-described pigment compositions in an industrially advantageous manner.

DETAILED DESCRIPTION OF THE INVENTION

In the following, the basic zirconium coating embodiment will first generally be discussed, and then the zirconium-silica coating embodiment (often referred to merely as the silica embodiment) and the zirconium-antimony coating embodiment (often referred to merely as the antimony embodiment) will be generally discussed, in the recited order.

Unless otherwise, indicated, the broad discussion offered with respect to the basic zirconium processing embodiment applies with equal force to the zirconium coated chromate particles which are subsequently subjected to the silica or antimony coating. However, it will be noticed by one skilled in the art that in the silica coating process the ripening of the zirconium coating system is preferably for less than 30 – 40 minutes and thereafter pH adjustment is preferably to 6 – 7. It will further be seen that in the antimony coating embodiment it is only necessary that free water be removed prior to redispersion in water or antimony coating, and that less zirconium is present on the chromate particles. These aspects are discussed in detail at a later point of this specification.

In the present invention, the chromate pigments coated are typified by lead chromate but, in addition, include rust-inhibiting pigments such as barium chromate, strontium chromate, potassium chromate, zinc chromate, and the like, which can be used as combinations of two or more thereof. Also, all that is required is that these chromate pigments be continued as a major component in the composition. Therefore, there are also included, for example, chromate pigments physically or chemically containing chromate as a major component and other substances, e.g., lead chromate, which is highly preferred in the silica embodiment, includes lead chromate and a lead chromate pigment physically or chemically containing lead chromate as a major component.

Colors represented in terms of the so-called color index Nos. 77,600, 77,601, 77,603 and 77,605 are typical colors based on the lead chromate pigments as are used.

In the present invention, the zirconium film applied to the surface of the pigment particles is formed from zirconium hydroxide $[Zr(OH)_4]$ produced by the hydrolysis of a zirconium salt.

Therefore, in the first stage of coating, the zirconium coating film in accordance with the present invention is uniformly deposited as a precipitate of zirconium hydroxide on the surface of the particles of the pigment.

After being coated on the surface of the chromate pigment particles, this zirconium film is further subjected to a dehydration step or a drying step to further strengthen the bonding force. Thus, the zirconium coating film is in a state strongly bonded to the surface of the particles.

The thus formed zirconium coating film is considered to be bonded to the surface of said particles in a state free of free water or bond water or, in many cases, not in the form of a complete zirconium hydroxide but in the form where part of the hydroxy groups are dehydrated. Therefore, the composition can be represented by, for example, $ZrO(OH)_2$ or $ZrO_2.nH_2O$.

As is described above, the zirconium coating film of the present invention includes the state where zirconium hydroxide is partly dehydrated and the state where zirconium hydroxide is substantially dehydrated, i.e., the state of zirconium oxide, depending upon the degree of dehydration. In general, the greater the degree of dehydration, the greater the bonding strength between the zirconium film and the pigment particles.

Therefore, in the present invention, a zirconium compound is defined to have the above-described meanings, and the abovedescribed zirconium compound deposited on the pigment particles is referred to as a zirconium coating film.

Surprizingly enough, even as an extremely thin film, this zirconium coating film exhibits marked coating effects. For example, the amount can be as small as 0.1 - 0.5 percent by weight (calculated as $ZrO_2$) based on the total amount. This fact does not prevent the coating film from increasing in amount. However, when the amount of zirconium film exceeds about 20 percent by weight (calculated as $ZrO_2$) based on the total amount, there cannot be expected an increase in coating effects corresponding to the increase in the amount thereof, whereas the coloring capability and hiding power of the pigment are reduced, though the resistance against the external elements heretofore discussed becomes remarkable. Therefore, the upper limit of the amount of the zirconium coating film is up to 20 percent by weight (calculated as $ZrO_2$) based on the total amount. Thus, in the pigment composition of chromate in accordance with the invention, the amount of zirconium compound (calculated as $ZrO_2$) can properly be selected from the range of less than about 20 percent by weight depending upon the purpose for use. In many cases in the silica embodiment a zirconium film of 0.2 - 5 percent by weight in amount is sufficient. Where particularly great resisting property is required, the zirconium film may be used up to 20% by weight (calculated as $ZrO_2$).

In the silica embodiment, the above-described zirconium coating film is present between the surface of the lead chromate and the amorphous silicate particles, and can take various forms of from a thin film to a continuous thick, amorphous film. A particularly preferred state is that where the hydroxy groups are partly dehydrated.

However, when the amount of zirconium film exceeds about 10 percent (calculated as $ZrO_2$) based on the total, effects of the subsequent antimony-processing cannot be expected so much and coloring capability, saturation and hiding power of the pigment are reduced, though the resistance against the external stimulations becomes remarkable, and the various resisting properties or the like are improved by the zirconium- and antimony-coating. Therefore, the upper limit of the amount of the zirconium coating film is up to 10 percent by weight (calculated as $ZrO_2$) based on the total amount in the antimony embodiment. Thus, in the pigment composition of chromate in accordance with the antimony embodiment of the invention, the amount of zirconium compound (calculated as $ZrO_2$) is properly selected from the range of less than about 10 percent by weight depending upon the purpose for use.

In those pigments which are used as a rust-inhibitor, such as strontium chromate, zinc chromate and calcium chromate, the amount of the zirconium compound can sufficiently be 0.1 - 5 percent by weight. Where the amount exceeds about 5 percent, the rust-inhibiting effect will be reduced due to the coating effect. Hence, such amount is not preferred for a full illustration of the rust-inhibiting effect. Also, in the case where silica or the like is further coated on the zirconium coating film of the present invention deposited on lead chromate pigment particles to further improve the durability, the amount of the zirconium compound is 0.1 - 5 percent by weight as above. However, where durability is particularly required, even at the sacrifice of some coloring capability, the amount of the zirconium compound may be increased to about 20 percent by weight, with the previso that where resisting property or durability is particularly required even at the sacrifice of some coloring capability or saturation of the pigment, the amount of the zirconium compound may be increased to about 10 percent by weight in the antimony embodiment of the invention.

As is described above, the zirconium coating film can take various forms of from a thin film on the surface of the chromate to a continuous thick film. The zirconium coating film is in an amorphous state. A partcularly preferred state is that where hydroxy groups are partly dehydrated, since an extremely high bonding force is provided.

The above-described zirconium coating film is formed by processings as follows.

Firstly, a starting slurry of a chromate pigment is prepared in any usual manner. In many cases, this starting slurry is prepared at room temperature to 80°C. At this time the concentration of the slurry is about 50 - 200 g/liter, preferably 80 - 120 g/liter.

For example, a starting slurry of lead chromate is prepared by mixing lead nitrate with sodium chromate or sodium dichromate and, if necessary, an aqueous solution of an acid or alkali as a pH-adjusting agent is added to effect reaction. Upon ripening, the starting slurry tends to undergo a change in hue with the passage of time due to the development of chromate crystals. In the present invention, the processing for forming a zirconium coating film is preferably conducted before the ripening of the starting chromate slurry, i.e., before the development of chromate crystals. The zirconium film-forming processing is effected by adding an aqueous solution of a zirconium salt. After adding an aqueous solution of a zirconium salt, the resulting slurry is ripened for a suitable period of time.

The aqueous solution of a zirconium salt is preferably thin in concentration and the concentration is 4 percent at the highest. In particular, an aqueous solution of 0.1 - 3 percent by weight concentration is practical and preferred since it forms a good coating film. If the concentration of the zirconium salt increases higher than that, a non-uniform dispersion of the resulting zirconium hydroxide on the pigment particles results. Thus, such a concentration is not preferred.

Typical examples of the zirconium salt used in the invention are zirconium chloride, zirconium sulfate, zirconium nitrate and the basic salts thereof, such as zirconyl chloride, zirconyl sulfate, and zirconyl nitrate. There can also be used zirconium acetate or a water-soluble zirconate. In short, any zirconium compound capable of producing zirconium hydroxide in a slightly acidic state or alkaline state can be used without restriction.

The amount of the zirconium salt added varies widely depending upon the end use of the product, type of chromate and the like. However, in any case, the zirconium compound should not be added in an amount of more than 20 percent by weight (calculated as $ZrO_2$) based on the total amount and in the antimony embodiment the zirconium compound should not be added in the amount of more than 10 percent by weight (calculated as $ZrO_2$) based on the total amount. In many cases, the purpose of the processing can be attained by adding 0.1 - 5 percent by weight of the zirconium compound. However, where durability is strongly required even at the sacrifice of some pigment properties, such as saturation, the zirconium compound can be added in an amount of above 5 percent by weight up to 20 percent by weight in the zirconium and zirconium silica embodiments and where resisting property is strongly required, the zirconium compound can be added in an amount of above 5 percent by weight up to 10 percent by weight in the zirconium-antimony embodiment.

The zirconium salt added under such conditions is rapidly hydrolyzed in the starting chromate slurry to produce zirconium hydroxide, which in turn deposits on the surface of the chromate pigment particles so that it uniformly coats the particles. At this time, it is preferred to adjust the pH with an acid or alkali to the pH at which zirconium hydroxide is produced.

As is described above, extremely fine and amorphous zirconium hydroxide deposits on the surface of the chromate particles in the form of from a thin film to a thick film, depending upon the amount of the zirconium salt added.

On the other hand, the development of the crystals in the ripening of the slurry is substantially depressed due to the deposition of the zirconium hydroxide on the surface of the particles.

It is generally believed that too great a development of the chromate crystals is not favorable due to the reduction in pigment properties. In particular, in the case of monoclinic lead chromate, the development must be avoided as much as possible, since yellowish-green pigment becomes difficult to obtain.

In the present invention, since the effective deposition of the zirconium hydroxide produced on the pigment particles inevitably controls the development of the crystals, the abovedescribed problems are almost removed.

After adding the zirconium salt to the starting slurry, the slurry is stirred for a short period of time to ripen the slurry. The ripening period is within about 1 hour (see, however, the shorter ripening period for the silica embodiment). Thereafter, the system is neutralized so that the pH is adjusted to 5 – 8 in order to stabilize the slurry of chromate (pH of 6 – 7 being preferred where silica coating is to be conducted). After neutralizing the slurry, it is washed with water and filtered. Thus, there is obtained from the slurry a filter cake having deposited on the particles zirconium hydroxide.

Subsequently, dehydration processing is conducted so as to strongly bond the zirconium compound to the pigment particles. This is usually conducted by drying. However, direct drying is not necessarily required for some uses or processings. For example, the filter cake can be left to stand for a while or can be air dried. In any drying processing, however, it is necessary to reduce the water content of the filtrate to less than about 30 percent by weight. In the usual drying, the drying can be conducted to the desired degree at a temperature of less than 110°C, but in general a temperature of 60° -110°C is preferred. By this dehydration processing, the zirconium compound is uniformly deposited on the surface of the pigment of chromate in a state free of free water or bound water or, in many cases, not in the state of mere zirconium hydroxide but in the state where the hydroxy groups are partly dehydrated. Zirconium compound in the state where hydroxy groups are partly dehydrated forms a coating film which is bonded more strongly to the pigment particles.

further, in the past, rust-inhibiting agents such as strontium chromate, zinc chromate and calcium chromate have been used as such. However, as a result of processing with a zirconium compound as in the present invention, the solubility of the pigment composition can be effectively adjusted. Thus, by conducting the coating of the present invention, the rust-inhibiting action thereof is not reduced but rather the lasting property of the action is remarkably improved. The zirconium coating exerts marked effects on he rust-inhibiting pigments in a very small amount. Of course, considering the purpose of the pigment, the resisting properties are not always required. However, referring to the coating effects described hereinafter, the above-described rust-inhibiting pigments also have improved durability or resisting properties as in the lead chromate pigment composition.

As is described above, the present invention provdes a specific rust-inhibiting pigment composition having various resisting properties without deteriorating the rust-inhibiting effect, by coating a rust-inhibiting pigment with zirconium film.

As described above, the zirconium film-coated cromate pigments of the present invention have excellent durability as compared with the conventional pigments, and are excellent in rust-inhibiting compositions.

However, the coating effects are further improved by coating the zirconium-coated chromate pigment of the present invention with amorphous silica or antimony. The above-described effects are remarkable as compared with the case of, e.g., directly coating the pigment particles with silica or antimony, or processing after processing the pigment particles with alumina.

Thus, although the zirconium-coated chromate pigment compositions of the present invention have sufficient durability to attain the objects of the invention, and can be marketed as such, they can be effectively utilized as an intermediate for producing a silica-coated pigment composition or antimonycoated composition. For example, as compared with coating silica or the like directly onto pigment particles, various marked resisting effects as heretofore described can be imparted to the pigment when a zirconium compound is present therebetween, since the zirconium compound has a strong bonding force not only for the pigment but also for silica and therefore functions as a binder for the two.

These embodiments or modifications of the basis zirconium coating embodiment will now be described, referring to these embodiments, respectively, as the silica embodiment and the antimony embodiment. The silica embodiment will first be described. In the following discussion, unless otherwise indicated, all conditions for forming the zirconiuim-coated pigment are the same as in the basic zirconium embodiment.

The (Zirconium)-Silica Embodiment

As earlier indicated, after adding the zirconium salt to the starting slurry, the slurry is stirred for a while to ripen. In the silica embodiment, the ripening period is preferably 30 – 40 minutes at the longest.

Thereafter, the system is neutralized so that the pH is adjusted to 6 – 7 in order to stabilize the slurry of chromate, which is preferably lead chromate. As earlier indicated, these processings are quite the same as in conventional processings except for the addition of zirconium. After neutralizing the slurry and washing and filtering it as earlier described, there is obtained filter cake having zirconium hydroxide deposited on the chromate particles.

The resulting filter cake is then redispersed in water and subjected to a silica coating processing as will now be described in detail. The filter cake should be subjected to a dehydration processing prior to the silica coating processing. Although the filter cake can be directly redispersed in water and subjected to silica processing, the resulting product becomes bulky and, as is previously stated, the bonding strength of the zirconium coating is often not sufficient. Therefore, direct processing of the filter cake should be avoided. The above-described fault can be substantially removed by reducing the water content of the filtrate to less than about 30 percent by weight. In order to obtain a filtrate having such water content, it is particularly preferred to add a drying step to the processing sequence.

However, the drying step is not indispensable, but the filter cake may be permitted to stand or aerated to some extent. In short, it is necessary to reduce the water content of the filtrate to less then 30 percent by weight. In the case of conducting drying, the drying is conducted at a temperature less than 110°C to an extent that the water content is reduced to a desired degree. In general, a drying temperature of 60° – 110°C is preferred.

As is described above, the zirconium compound is uniformly deposited on the surface of the (lead) chromate particles in the state where free water or bound water is removed or, in many cases, not in the state of mere zirconium hydroxide but in the state where hydroxy groups are partly dehydrated, depending upon the degree of dehydration. In many cases, a stronger and more stable coating film can be formed by redispersing a dried composition in water where the hydroxy groups are partly dehydrated.

In the present invention, zirconium coating processing is conducted as above. After zirconium processing the starting slurry, it is necessary to remove water and reduce the water to content to less than the recited amount.

Therefore, if a zirconium processed slurry is directly subjected to the silica coating processing without separating the solid phase from the liquid phase, the substantial effects of the zirconium processing cannot be expected.

In the present invention, the silica coating film is considered to be formed on the aforesaid zirconium coating film. This film may be regarded as a continuous amorphous deposition similar to silica. This silica coating film may be formed by a known process, which process is described in detail in, for example, U.S. Pat. No. 2,885,366, Japanese Patent Publication 9555/71, and the like.

In the present invention, since a zirconium coating film is present between the pigment particles and the fine silica particles and functions as a binder, the zirconium and silica coating is extremely tough and stable.

This silica coating film is formed by redispersing the zirconium coated filter cake dehydrate and depositing silica sol uniformly on the redispersed pigment particle surface. The silica sol particles are usually less than 200 m$\mu$ in grain size, and most of them are extremely fine and of 10 – 100 m$\mu$ in grain size. Therefore, the surface area thereof is extremely large.

The silica coating film is thicker than the zirconium coating film, though it depends on the proposed end use of the product. The coating amount is 3 – 40 percent by weight based on the total amount of the chromate pigment composition, preferably lead chromate.

When the amount of silica is less than about 3 percent by weight, the various resisting effects of the pigment particles tends to be lost, while when the amount becomes greater than 40 percent by weight, the hue tends to be deteriorated due to too much dilution and, in addition, the resisting effects are not so greatly improved.

In general, an amount of silica of 10 – 25 percent by weight is most effective and particularly preferred.

The fine silica particles ae amorphous and form a thick, continuous film on the surface of each lead chromate pigment particle which has been coated with zirconium film.

It will thus be understood from the fact that each zirconium and silica coated lead chromate pigment particle shows excellent resistance against internal and external stimulations that the coating is strong and stable.

The coating processing of zirconium and silica can be conducted by redispersing the zirconium processed dehydrated filtrate in water. The redispersion is conducted in an alkaline medium because of the property of the pigment particles. Therefore, in many cases, an aqueous solution of an alkali silicate is added as an alkali agent. However, this is not a specific operation of silica treatment but is conducted to obtain the effect of dispersing the particles, which operation is often employed.

The slurry concentration can be the same as the aforesaid starting zirconium coating slurry concentration. In addition to an alkali silica solution, there can be used caustic alkali, alkali carbonate or ammonia. Also, at this time, any common means to apply mechanical shear is often employed so as to effectively redisperse each of the secondarily agglomerated particles. It is particularly important in the silica processing to disperse each particle to the degree of primary particles of zirconium-coated lead chromate by chemical and physical means. In this invention, the zirconium-processed dehydrated filtrate has an excellent dispersing property, and hence substantially no separation of the zirconium film from the pigment particles occurs.

The slurry of zirconium coated pigment particles thus redispersed in water which is on the alkaline side is then heated to not less than 60°C, preferably 85° – 95°C, and stirred.

The pH of the slurry in this stage is adjusted to 7 – 11, preferably 9 – 10.

A previously prepared silica sol or silica sol-producing substance is added to the thus maintained slurry to provide a fine silica sol in the slurry, whereby silica sol is uniformly deposited on the surface of the pigment particles.

As the process for producing silica sol in the slurry, one process comprises adding an aqueous solution of sodium silicate to the slurry while controlling the pH with an aqueous solution of a mineral acid, such as sulfiric acid or hydrochloric acid. As the aqueous solution, a thin solution is more preferred. Particularly, an aqueous solution of a 1 – 7 percent (by weight) concentration is preferred. It is preferred to add both solutions at the same time over a prolonged period of time, usually 2 – 4 hours. In addition, as the aqueous solution of sodium silicate, one containing a smaller amount of sodium is more preferred. The molar ratio of $SiO_2/Na_2O$ is preferably 3.2 – 3.4. The aqueous solution of sodium silicate is added in an amount of 3 – 40 percent by weight (calculated as $SiO_2$) based on the total amount of the product. Preferred colloidal silica particles are produced in large amount in the slurry under such conditions. In particular, pH and the temperature of the slurry must be sufficiently controlled.

If the addition is conducted under conditions other than the above-described conditions, a so-called siloxane bond is sometimes formed and a porous silica gel is liable to result, which results in the formation of nonuniform film on the pigment particles. Therefore, care must be taken as to the conditions.

The silica coating film is formed by the deposition of the fine silica sol present in the slurry on the thin zirconium hydroxide coated lead chromte particles in large amounts.

If the silica sol is previously produced in a separate step, the silica sol solution can be added to the slurry.

Processes for producing a silica sol solution are known, e.g., where a silica sol solution is prepared from a dilute sodium silicate aqueous solution using a hydrogen-type cationic ion exchange resin. It is also possible to produce the silica sol from a dilute alkali silicate solution and sulfuric acid by the same procedures as above while dialyzing the salt formed as a by-product to substantially increase the sol concentration. However, such a process requires a separate step and is not generally used.

Thus, silica sol is produced in the slurry and, after depositing the silica on the surface of the pigment particles, the slurry is subjected to a neutralizing processing and a ripening step. After filtration, washing with water, and drying in a conventional manner, the end product is obtained.

After the deposition of the silica sol, a rosin metal salt such as a calcium salt or barium salt may, if desired, be precipitated in a conventional manner to conduct a further surface processing.

The thus obtained zirconium and silica coated chromate pigment has a large resisting property as described before. In particular, the resistance to heat, light and chemicals is excellent.

In the composition of the present invention and the process for producing the same, a chromate pigment, generally lead chromte, is used as the basic material. However, other chromates, such as calcium chromate, strontium chromate, barium chromate, or zinc chromate can also be used. In addition, modified chromate pigments can also be used.

Having thus discussed the zirconium silica coating embodiment or the silica embodiment, it is appropriate to turn to a detailed discussion of the zirconium antimony coating or the antimony embodiment.

As earlier indicated, in the basic zirconium coating formation, after adding the zirconium salt to the starting slurry, the slurry is stirred for a while to ripen. The ripening period is within about one hour.

Thereafter, the system is neutralized so that the pH is adjusted to 5 – 8 in order to stabilize the chromte slurry. After neutralizing slurry and washing and filtering in a conventional manner to separate the solid phase from the liquid phase, there is obtained from the slurry a filter cake having deposited on the particles zirconium hyroxide. In the antimony embodiment, the thus obtained, zirconium processed chromate pigment is processed with an antimony compound.

It is known to process a chromate pigment with an antimony compound. In the present invention, the processing method itself is not different from known methods. The zirconium coated chromate pigment composition to be processed with antimony is used in the form of the aforesaid filter cake, which is redispersed in water as such to conduct the processing.

In preparing the zirconium coated pigment slurry, the filter cake can be dried and then redispersed in water. However, drying of the filter cake is not particularly necessary. It is sufficient to separate free water from the filtrate cake. However, if the zirconiuim coated pigment is directly processed with the antimony compound without separating the solid phase of the slurry from the liquid phase, the salt concentration becomes too high to effectively conduct the processing with antimony and, in addition, contaminating ion are adsorbed onto the zirconium film, and hence good effects by the coating cannot be expected.

Therefore, where drying of the filter cake is not conducted, a strong coating film where the hydroxide is partly dehydrated is formed at the stage where the end product is finally dried.

The antimony coating film is formed by the deposition of a water-insoluble antimony compound as in the basic zirconium processing. However, the mechanism thereof varies depending upon the antimony compound added. The mechanism of the formation can be assumed to be roughly as follows. Antimony hydroxide produced by hydrolysis is deposited on the pigment particles, or, since antimony hydroxide is dehydrated at a comparatively low temperature, antimony oxide ($Sb_2O_3 \cdot nH_2O$) may be deposited. Insoluble products produced by the hydrolysis of antimony halides, such as acid halide ($Sb_2O_3 \cdot nSbOX_2$), and other insoluble antimony compounds such as antimonic acid ($H_3SbO_4$) are deposited on the pigment particles. Therefore, in the invention, the insoluble deposit on the pigment particles from the antimony processing is defined as an antimony compound. These are all fine and amorphous deposits.

In the invention, the antimony compound is present in an amount of 1 – 10 percent by weight (calculated as $Sb_2O_3$). In particular, an amount of 3 – 5 percent by weight is preferred for combination with the zirconium coating film. If the amount is less than 1 percent by weight, the effect of antimony coating is not obtained and the resisting property is not improved by the antimony processing, while if the amount exceeds about 10% by weight, the hue becomes faded and discolored, though the resisting property is be markedly improved. Therefore, amounts outside the above range should be avoided.

The zirconium and antimony coated chromate pigment composition of the present invention is formed by depositing a zirconium compound and an antimony compound around the pigment particles as described above. However, these two compounds need not necessarily be in a two-layered form. Considering the order of the starting materials, it can be considered that in many cases there are substantially formed two layers due to the deposition of two compounds. However, the two deposits may take the form wherein both are present in a mixed state, depending upon the degree of the deposited amount or the processing method.

The processing with an antimony compound is known but, in the invention, it is conducted, for example, as follows.

As described before, the filter cake obtained by zirconium processing is redispersed as such in water to form a slurry. This slurry is prepared, similarly to the zirconium processing, at an ordinary temperature of 80°C and at the concentration of 50 – 200 g/liter. In the redispersing, sufficient stirring is conducted to obtain a uniform slurry. At this time, the dispersing property is greatly improved by adding an aqueous solution of sodium silicate. It is of importance in the zirconium embodiment of the invention to add an aqueous solution of sodium silicate. As the sodium silicate aqueous solution used, any solution can be used regardless of the composition. With respect to commercially available sodium silicate aqueous solutions, it can be sufficient to add such a solution in an amount of 0.5 – 10 parts per 100 parts of the slurry having the above-described concentration. Since rapid addition of the sodium silicate aqueous solution could cause gelation of silica, it is gradually added while the slurry is being stirred. Thus, an extremely well dispersed slurry is produced.

The antimony compound added for antimony processing is required to be water-soluble or, if water-insoluble, required to be soluble in hydrofluoric acid from the viewpoint of the purpose for use.

As the antimony compound, 3-valent or 5-valent compounds can be used, however, 3-valent compounds are preferred.

As such compound, there are illustrated, for example, antimony trifluoride, antimony trichloride or like antimony trihalides, antimony trioxide, antimony hydroxide, potassium antimonite, sodium antimonite, and the like. Water-insoluble antimony compounds are used as a solution by dissolving them in hydrofluroic acid. The concentration is not particularly limited, but, the thicker or more concentrated, the better.

After the addition of the antimony solution to the slurry, stirring is continued for a while to conduct antimony processing. The antimony compound is gradually converted to a water-insoluble compound and oxidized, depending upon the kind of the additive, by, e.g., antimony hydroxide, an acid halide or a chromate, to form an insoluble antimony compound partly containing 5-valent atoms, such as antimonic acid, thus depositing on the zirconium processed pigment particles.

In this invention, the water-insoluble deposit produced by processing the slurry with the antimony compound is defined as a water-insoluble antimony compound. Since the zirconium processed filter cake is directly redispersed in water, the zirconium compound is in the state of being partly separated from the pigment particles when subjected to the antimony processing. Therefore, the resulting composition does not necessarily have a structure where the zirconium compound and the antimony compound form two clear layers.

After the antimony processing, the slurry is neutralized and then filtered, washed with water and dried in a conventional manner to obtain the end product.

The thus obtained zirconium and antimony coated chromate pigment composition has a great resisting property as compared with a conventional antimony processed pigment. In particular, its resistance to heat, light and chemicals is remarkable. Since this composition provides the resisting property to rust-inhibiting pigments without deteriorating their rust-inhibiting effect, it can be used in a so-called "one-coating method."

The present invention will now be described more specifically by several non-limiting examples, wherein parts are by weight.

In the following examples, Examples 1 – 10 and Comparison Examples 1 – 5 deal with the basic zirconium coating embodiment. Examples 11 – 18 and Comparative Examples 6 – 11 deal with the silica embodiment and Examples 19 – 29 and Comparative Examples 12 – 19 deal with the antimony embodiment.

EXAMPLE 1

218 Parts of a 8.2 percent by weight aqueous solution of sodium carbonate was added to 1665.5 parts of a 99.3 percent by weight aqueous solution of lead nitrate and the system stirred for about 15 minutes.

Separately, 17.5 parts of sulfuric acid was added to 1,541 parts of a 26.6 percent by weight aqueous solution of sodium dichromate to prepare an aqueous solution of sodium dichromate.

Then, both solutions were mixed over a 30 minute period to react them. Thus, there was obtained a starting slurry of lead chromate.

To this starting slurry was gradually added 4.8 parts of a 0.3 percent by weight aqueous solution of zirconium sulfate ($ZrOSO_4 \cdot nH_2O$) (calculated as $ZrO_2$), and then 14 parts of sodium carbonate was added thereto to adjust the pH of the slurry to about 5.5, thereby conducting zirconium processing.

Subsequently, decantation, washing with water and filtration were conducted in a conventional manner, and the resulting filter cake dried at 85° – 95°C for 12 hours to obtain 160 parts of a greenish-yellow, zirconium coated lead chromate (color index No. 77,603).

EXAMPLE 2

A solution prepared by adding 73 parts of sodium chromate and 1.4 parts of sodium hydroxide to 1,800 parts of water was added to a 69.3 percent aqueous solution of lead nitrate over a 30 minute period to react them and prepare a starting slurry of lead chromate. To this starting slurry was gradually added 4.5 parts of a 0.3 percent by weight aqueous solution of zirconyl chloride ($ZrOCl_2 \cdot 8H_2O$) (calculated as $ZrO_2$), and then 4 parts of sodium carbonate was added thereto to adjust the pH of the slurry to 6.4, thereby effecting zirconium processing.

Subsequently, decantation, washing with water and filtration were conducted in a conventional manner, and the resulting filter cake was dried at 90° – 100°C for 12 hours to obtain 150 parts of reddish, zirconium coated lead chromate (color index No. 77,600).

EXAMPLE 3

A solution prepared by dissolving 50.2 parts of sodium dichromate, 9.6 parts of sulfuric acid and 11.2 parts of sodium molybdate in 2,400 parts of water was gradually added to a lead nitrate aqueous solution prepared by dissolving 165.5 parts of lead nitrate in 4,000 parts of water to obtain a starting slurry of molybdate orange. To this starting slurry was added 8 parts of a 0.3 percent by weight aqueous solution of zirconyl sulfate ($H \cdot ZrO \cdot OH \cdot SO_4 \cdot 2H_2O$) (calculated as $ZrO_2$), and then 10 parts of sodium carbonate was added thereto to adjust the pH of the slurry to 6.0, thereby conducting zirconium processing.

Subsequently, decantation, washing with water and filtration were conducted in a conventional manner, and the resulting filter cake was dried at 95° – 105°C for 10 hours and then pulverized to obtain 160 parts of zirconium coated molybdate orange (color index No. 77,605).

EXAMPLE 4

In a manner identical to Example 2, but employing 1.5 parts of a 0.3 percent by weight aqueous solution of zirconyl chloride ($ZrOCl_2.8H_2O$) (calculated as $ZrO_2$), there was obtained reddish, zirconium processed chrome yellow (color index No. 77,6000).

EXAMPLE 5

In a manner identical to Example 2, but employing 7.5 parts of a 0.3 percent by weight aqueous solution of zirconyl chloride ($ZrOCl_2.8H_2O$) (calculated at $ZrO_2$), there was obtained reddish, zirconium processed chrome yellow (color index No. 77,600).

EXAMPLE 6

In a manner identical to Example 2, but employing 30 parts of a 0.3 percent by weight aqueous solution of zirconyl chloride ($ZrOCl_2.8H_2O$) (calculated as $ZrO_2$), there was obtained reddish, zirconium processed chrome yellow (color index No. 77,600).

EXAMPLE 7

100 Parts of strontium nitrate was dissolved in 1,500 parts of 15°C water. To this was added a solution prepared by dissolving 131 parts of sodium chromate in 1000 parts of water, over about 1 hour, and the system stirred for a while to obtain a starting slurry of strontium chromate.

To this starting slurry there was added 0.9 part of a 0.3 percent by weight aqueous solution of zirconyl sulfate ($HZrO.OHSO_4.2H_2O$) (calculated as $ZrO_2$), and the pH was adjusted to about 7.2 with sodium carbonate. Then, decantation and washing with water were conducted in a conventional manner, and the product was dried at about 100°C to obtain 90 parts of zirconium processed strontium chromate.

EXAMPLE 8

In a manner analogous to Example 7, but employing 4.5 parts of a 0.3 percent aqueous solution of zirconyl sulfate ($HZrOOH.SO_4.2H_2O$) (calculated as $ZrO_2$), there was obtained zirconium processed strontium chromate.

EXAMPLE 9

100 Parts of barium chloride was dissolved in 1,500 parts of 18°C water. To this was added a solution prepared by dissolving 67 parts of sodium chromate in 1,000 parts of water over about a 20 minute period, and the system stirred for a while to obtain a starting slurry of barium chromate.

To this starting slurry there was added 1.04 parts of an aqueous solution of zirconyl sulfate ($HZrOOH.SO_4.2H_2O$) (calculated as $ZrO_2$). The pH of the slurry was adjusted to 7.3 with sodium carbonate. Then, decantation and washing with water were conducted in a conventional manner, and the product was dried to obtain 104 parts of zirconium processed barium chromate.

EXAMPLE 10

In a manner analogous to Example 9, but employing 5.2 parts of a 0.3 percent by weight aqueous solution of zirconyl sulfate ($HZrOOH.SO_4.2H_2O$) (calculated as $ZrO_2$), there was obtained zirconium processed barium chromate.

COMPARISON EXAMPLE 1

165.5 Parts of lead nitrate was dissolved in 1,500 parts of 18°C water and 200 parts of a 8.25 percent by weight aqueous solution of sodium carbonate was added thereto and the system stirred for 15 minutes. Subsequently, a solution prepared by dissolving 41 parts of sodium dichromate in 1,500 parts of water and adding thereto 17.5 parts of sulfuric acid was added to the abovedescribed lead nitrate solution to react and prepare a starting slurry of lead chromate.

To this starting slurry there was added an aqueous solution prepared by dissolving 10 parts of aluminum sulfate ($Al_2(SO_4)_3.18H_2O$) in 150 parts of water, and 14 parts of sodium carbonate was added thereto to adjust the pH to about 5.5. After decantation, washing with water and drying, there was obtained 160 parts of greenish yellow chrome yellow (color index No. 77,603).

COMPARATIVE EXAMPLE 2

149 Parts of lead nitrate was dissolved in 2,000 parts of water and maintained at 40°C. To this was gradually added a solution prepared by dissolving 73 parts of sodium chromate and 1.4 parts of sodium hydroxide in 1,800 parts of water to react. Thus, there was obtained a starting slurry of lead chromate.

To this starting slurry there was added 8 parts of aluminum sulfate ($Al_2(SO_4)_3.18H_2O$) dissolved in 70 parts of water, and further 4 parts of sodium carbonate was added thereto to adjust the pH to about 6.4. After washing with water by decantation, filtration and drying, there was obtained 150 parts of reddish chrome yellow (color index No. 77,600).

COMPARATIVE EXAMPLE 3

165.5 Parts of lead nitrate was dissolved in 4,000 parts of water and a solution prepared by dissolving 50.2 parts of sodium dichromate, 9.6 parts of sulfuric acid and 11.2 parts of sodium molybdate in water was added thereto over a 10 minute period and the system stirred for 30 minutes to prepare a starting slurry of molybdate orange.

To this starting slurry there was added 10 parts of aluminum sulfate ($Al_2(SO_4)_3.18H_2O$) dissolved in 100 parts of water, and further 10 parts of sodium carbonate was added thereto to adjust the pH to about 6.0. After washing with water by decantation, filtration and drying, there was obtained 160 parts of molybdate orange (color index No. 77,605).

COMPARATIVE EXAMPLE 4

100 Parts of strontium nitrate was dissolved in 1500 parts of 18°C water. To this was added a solution (prepared by dissolving 131 parts of sodium chromate in 1000 parts of water) over about a 1 hour period, and the system stirred for a while. Then, the pH was adjusted to about 7.2 with sodium carbonate. After washing with water by decantation, filtration and drying in a conventional manner, there was obtained 90 parts of strontium chromate pigment.

COMPARATIVE EXAMPLE 5

100 Parts of barium chloride was dissolved in 1500 parts of 18°C water, and a solution prepared by dissolving 67 parts of sodium chromate in 1000 parts of water was added thereto over about a 20 minute period and the system stirred for a while. The pH of the slurry was then adjusted to about 7.3 with sodium carbonate. After washing with water by decantation, filtration and drying, there was obtained 104 parts of a barium chromate pigment. Test examples:

Various resisting properties of the chromate pigment compositions obtained in the above Examples and Comparative Examples were tested in the following manner. 1. Sulfide resistance The change in the hue of a coated plate (described hereinafter) after immersing it in a saturated hydrogen sulfide aqueous solution for 10 minutes at room temperature was compared to a coated plate which was not immersed. 2. Acid resistance 4 Grams of each pigment powder was immersed in 20 ml of 1 percent by weight sulfuric acid for 1 hour with occasional stirring, and then washed, filtered and dried. The samples before and after this processing were formed into paint with a lacquor and comparatively examined. 3. Alkali resistance The same test as in the test of acid resistance is conducted using 1 percent by weight sodium hydroxide to determine the alkali resistance. 4. Heat resistance 0.8 Percent by weight of each pigment was dispersed in a polyethylene resin and allowed to stay in an extruder at 230°C for 10 minutes. The resulting sample was compared with one processed at 180°C for 3 minutes. 5. Light resistance The change upon irradiating a coated plate for 20 hours with a Fade-O-Meter was examined. 6. Dispersion property Each sample was formed into a paint, applied to a glass plate in a thickness of 3 mils by means of an applicater and baked at 150°C for 30 minutes to examine the surface state.

The coated plates used in test run Nos. 1, 5 and 6 were produced as follows.

8 Parts of pigment and 60 parts of beads were mixed with 12 parts of melamine alkyd resin, and the resulting mixture was dispersed for 30 minutes by means of a paint shaker. Then, the beads were removed by filtration and 5 parts of thinner added to the filtrate and the filtrate applied to a given steel plate by an applicater. After standing for 30 minutes, the assembly was baked at 150°C for 30 minutes to obtain testing samples.

The above tests were conducted using the thus prepared testing samples. The samples were rated in terms of 5 grades, wherein seriously faded or discolored sample was rated 1 while unchanged samples were rated 5. The results are tabulated below.

| Run No. | Resisting property | Sulfide resistance | Acid resistance | Alkali resistance | Heat resistance | Light resistance | Dispersion property | |
|---|---|---|---|---|---|---|---|---|
| Example Nos. | 1 | 3 | 5 | 4 | 4 | 5 | 5 | C.I.No.77603 (ZrO$_2$ 3%) |
| | 2 | 3 | 5 | 4 | 5 | 5 | 5 | C.I.No.77600 (ZrO$_2$ 3%) |
| | 3 | 3 | 5 | 4 | 4 | 5 | 5 | C.I.No.77605 (ZrO$_2$ 5%) |
| | 4 | 3 | 4 | 3 | 4 | 5 | 5 | C.I.No.77600 (ZrO$_2$ 1%) |
| | 5 | 3 | 4 | 3 | 3 | 4 | 4 | C.I.No.77600 (ZrO$_2$ 5%) |
| | 6 | 3 | 3 | 3 | 2 | 4 | 4 | C.I.No.77600 (ZrO$_2$ 20%) |
| | 7 | 5 | 5 | 5 | 5 | 5 | 5 | (SrCrO$_4$ (ZrO$_2$ 1%) |
| | 8 | 3 | 4 | 4 | 4 | 4 | 4 | SrCrO$_4$ (ZrO$_2$ 5%) |
| | 9 | 4 | 4 | 5 | 5 | 4 | 5 | BaCrO$_4$ (ZrO$_2$ 1%) |
| | 10 | 3 | 4 | 5 | 4 | 4 | 4 | BaCrO$_4$ (ZrO$_2$ 5%) |
| Comparative example | 1 | 1 | 3 | 1 | 1 | 1 | 4 | C.I.No.77603 Al$_2$(SO$_4$)$_3$·18H$_2$O |
| | 2 | 1 | 3 | 1 | 1 | 1 | 4 | C.I.No.77600 Al$_2$(SO$_4$)$_3$·18H$_2$O |
| | 3 | 1 | 3 | 1 | 1 | 1 | 4 | C.I.No.77605 Al$_2$(SO$_4$)$_3$·18H$_2$O |
| | 4 | 1 | 3 | 3 | 3 | 3 | 4 | SrCrO$_4$ |
| | 5 | 1 | 1 | 5 | 2 | 3 | 4 | BaCrO$_4$ |

EXAMPLE 11

165.5 parts of lead nitrate was dissolved in 1500 parts of water at 18°C, and 200 parts of a 8.25 percent by weight sodium carbonate aqueous solution was added thereto and the system stirred for 15 minutes. Subsequently, 41 parts of sodium dichromate was dissolved in 1,500 parts of water and 17.5 parts of sulfuric acid was added thereto. The resulting solution was added to the abovedescribed lead nitrate solution over about 30 minutes to react. Thus, there was obtained a starting slurry of lead chromate.

To this starting slurry was added zirconyl sulfate (ZrO.SO$_4$.nH$_2$O) in an amount of 0.8 part as ZrO$_2$ dissolved in 300 parts of water, and further, an aqueous solution of sodium carbonate was added thereto to adjust the pH of the slurry to about 5.5 to effect zirconium processing.

After washing with water by decantation and filtration, the resulting filter cake was dried by a drier maintained at 85 – 90°C for 12 hours to obtain 160 parts of greenish-yellow, zirconium coated chrome yellow (color index No. 77,603).

The resulting dried product was pulverized, and 150 parts of the product was redispersed in 1,350 parts of water and stirred at a room temperature until it became uniform. To this slurry there was then gradually added 20 parts of an aqueous solution of sodium silicate ($SiO_2/Na_2O$ = 3.20 – 3.30, $SiO_2$: 29.0 – 31.6 percent) and the stirring was continued for a while. This slurry was then homogenized to render it uniform and disperse the pigment particles as much as possible. The temperature of the system was then raised to 85° – 95°C and maintained, if necessary, a sodium hydroxide solution was added thereto to adjust the pH of the slurry to 9.0 to 10.0.

Thereafter, solution A prepared by diluting 125 parts of the aforesaid sodium silicate solution to a volume corresponding to 600 parts of water and solution B prepared by diluting 17.3 parts of 96 percent sulfuric acid to a volume corresponding to 800 parts of water were added at the same time to the above-described slurry (while stirring) at a rate of 5 parts/min. During the addition of both solution A and solution B, the pH of the slurry was controlled to be 9.0 – 10.6. Thus, a fine silica sol was produced and deposited uniformly on the surface of the pigment particles.

The pH of the slurry was then adjusted to 6.5 – 7.0 and the slurry allowed to stand, and then washed with water by decantation until sulfate was completely removed. Upon filtration and drying, there was obtained 180 parts of greenish yellow, zirconium and silica coated pigment.

EXAMPLE 12

149 Parts of lead nitrate was dissolved in 2000 parts of water and maintained at 40°C. To this solution there was added gradually a solution prepared by dissolving 73 parts of sodium chromate and 1.4 parts of sodium hydroxide in 1800 parts of water to react. There was thus obtained a starting slurry of lead chromate.

To this starting slurry was added a 0.3 percent by weight zirconyl chloride ($ZrOCl_2 \cdot 8H_2O$) solution in an amount of 0.8 part as $ZrO_2$, and 4 parts of sodium carbonate was added thereto to adjust the pH of the slurry to 6.4 to effect zirconium processing.

The slurry was then washed with water by decantation and filtrated to obtain filter cake, which was then dried for 12 hours in a drier at 96° –100°C and pulverized to obtain 150 parts of zirconium coated yellow chrome (color index No. 77,600).

150 Parts of the resulting pigment was subjected to silica coating processing under the same conditions and procedures as in Example 11 to obtain about 180 parts of zirconium and silica coated lead chromate pigment composition.

EXAMPLE 13

165.5 Parts of lead nitrate was dissolved in 4,000 parts of water, and a solution prepared by dissolving 50.2 parts of sodium dichromate, 9.6 parts of sulfuric acid and 11.2 parts of sodium molybdate in 2400 parts of water was added thereto over 10 minutes, and stirred for 30 minutes to prepare a starting slurry of molybdate orange.

To this slurry there was added a 0.3 percent by weight aqueous solution of zirconyl sulfate ($H.ZrO.OHSO_4 \cdot 2H_2O$) in an amount of 1.0 parts (calculated as $ZrO_2$) and sodium carbonate was added thereto to adjust the pH of the slurry to 6.0 to effect the zirconium coating processing.

After washing with water by decantation and filtration, the filtrate was dried at about 90°C for 12 hours, and then pulverized to obtain 160 parts of zirconium coated molybdate orange (color index No. 77,605).

150 Parts of the resulting dried product was pulverized and redispersed in water, then stirred at a room temperature to prepare a uniform slurry. The slurry solids concentration was adjusted to 100 g/liter. To this slurry there was added 20 parts of an aqueous solution of sodium silicate No. 3 and the stirring was continued for a while.

Thereafter, in a manner analogous to Example 11 except for employing 730 parts of a 5 percent by weight (calculated as $SiO_2$) solution of sodium silicate No. 3 and 860 parts of 2 percent by weight sulfuric acid, silica sol was produced, which was in turn deposited on the surface of the pigment particles. There was thus obtained about 180 parts of a zirconium and silica coated molybdate orange pigment composition (color index No. 77,605).

EXAMPLE 14

149 Parts of lead nitrate was dissolved in 2,000 parts of water and maintained at 40°C. Separately, 73 parts of sodium chromate and 1.4 parts of sodium hydroxide were dissolved in 1800 parts of water. The resulting solutions were mixed over 30 minutes to react. There was thus obtained a starting slurry of lead chromate.

To this starting slurry a 0.5 percent by weight zirconyl chloride ($ZrOCl_2 \cdot 8H_2O$) solution in an amount of 8 parts (calculated as $ZrO_2$) was gradually added. Then, a sodium carbonate solution was added thereto to adjust the pH to 6.4. Thus, fine zirconium hydroxide was produced in a large amount in the slurry, which was deposited uniformly on the surface of lead chromate particles to effect zirconium processing.

Thereafter, the slurry was washed with water by decantation and filtrated. The resulting filter cake was dried at 90° – 100°C for 12 hours and pulverized to obtain about 150 parts of zirconium coated lead chromate pigment (color index No. 77,600).

150 Parts of the resulting pigment was then processed in the same manner and procedure as in Example 11 to conduct silica coating processing. There was thus obtained about 180 parts of a zirconium and silica coated lead chromate composition.

EXAMPLE 15

The same starting slurry as in Example 14 was used, and a 0.5 percent by weight zirconyl chloride aqueous solution was added to the slurry in an amount corresponding to 30 parts of $ZrO_2$ and a sodium carbonate aqueous solution was further added thereto to adjust the pH to 6.4. Thus, uniform zirconium hydroxide was deposited in a large amount on the surface of the lead chromate particles similar to Example 14, thereby effecting zirconium processing. Thereafter, the slurry was washed with water by decantation and filtered to obtain a filter cake. This cake was then dried at 90° - 100°C for 12 hours and pulverized to obtain about 150 parts of zirconium coated lead chromate pigment (color index No. 77,600).

Thereafter, in a manner identical to Example 11 except for using 1000 parts of a 3 percent by weight aqueous solution of sodium silicate No. 3 and 800 parts of 2 percent by weight sulfuric acid to deposit the silica sol on the pigment particles, there was obtained a zirconium and silica coated lead chromate pigment composition.

EXAMPLE 16

150 Parts of the dried product of powdery lead chromate pigment having coated thereon a zirconium film prepared as in Example 11 was added to 1250 parts of water and stirred at a room temperature to prepare a uniform slurry. Then, 20 parts of sodium silicate No. 3 was gradually added thereto under stirring and maintained in this state for a while. This slurry was then homogenized to uniformly disperse the pigment particles as much as possible, then heated to 85° – 95°C over 30 minutes and the pH of the slurry was insured to be 9.0 – 10.0 by adding, if necessary, an aqueous solution of sodium hydroxide. Thereafter, a solution prepared by diluting 181 parts of "SNOWTEX-O" (made by Nissan Chemical Industries, Ltd.; $SiO_2$: 20 – 21%; $Na_2O$: less than 0.02%; pH: 3 – 4) to a volume corresponding to that of 750 parts of water was gradually added to the slurry over a 2½ hour period. During the addition, the pH was maintained at 9.0 – 10.0 and the temperature at 85° – 95°C.

After the completion of the addition of the silicate sol, stirring was continued for a further 30 minutes. Then, the slurry was washed with water by decantation, filtered and dried to obtain a zirconium and silica coated lead chromate pigment composition.

EXAMPLE 17

150 Parts of the dried product of powdery molybdate orange pigment having coated thereon the zirconium film prepared in Example 13 was added to 1250 parts of water and stirred at a room temperature to obtain a uniform slurry. Then, 20 parts of sodium silicate No. 3 was gradually added thereto under stirring and maintained in the state for a while. This slurry was then homogenized to uniformly disperse the pigment particles as much as possible, then its pH was adjusted to pH 9.0 – 10.0 and it was heated to 85° – 95°C as in Example 16.

Thereafter, a solution, prepared by diluting 200 parts of "SNOWTEX-O" to a volume corresponding to 800 parts of water was gradually added thereto and, by the same procedure as in Example 16, silica sol was uniformly deposited on the surface of the pigment particles.

Upon washing with water by decantation, filtration and drying, there was obtained a zirconium and silica coated molybdate orange pigment composition.

EXAMPLE 18

The zirconium processed filter cake obtained in Example 11 was crushed into small particles, and sample A containing about 5 percent by weight of water and sample B containing about 30 percent by weight of water were prepared therefrom.

Separately, the zirconium processed slurry obtained in Example 12 was adjusted to a 90 percent water content to prepare sample C.

These three samples were subjected to silica coating processing under the same condition and procedure as in Example 12 to obtain zirconium and silica coated lead chromate pigments.

Comparative samples were prepared in the following Comparative Examples 6 to 11 in order to compare the zirconium and silica coated lead chromate pigment composition of the present invention with the conventional pigment with respect to various pigment properties by the testing methods described hereinafter.

COMPARATIVE EXAMPLE 6

165.5 Parts of lead nitrate was dissolved in 1,500 parts of 18°C water, and 18 parts of sodium carbonate dissolved in 200 parts of water was added thereto and the system stirred for 15 minutes. Subsequently, a solution of sodium dichromate prepared by dissolving 41 parts of sodium dichromate in 1500 parts of water and adding thereto 17.5 parts of sulfuric acid was added to the aforesaid lead nitrate solution over about a 30 minute period to obtain a starting slurry. To this starting slurry was added a solution prepared by dissolving 10 parts of aluminum sulfate ($Al_2(SO_4)_3 \cdot 18H_2O$) in water, and, further, 14 parts of sodium carbonate was added thereto to adjust the pH to about 5.5. The aluminum hydroxide produced was uniformly deposited on the surface of the pigment particles to effect the alumina coating processing. Thereafter, the slurry was washed with water by decantation, filtered and dried in a conventional manner to obtain 160 parts of a greenish yellow, alumina coated lead chromate pigment composition (color index No. 77,603).

COMPARATIVE EXAMPLE 7

151 Parts of a 53 percent by weight aluminum sulfate aqueous solution was added to the starting slurry of lead chromate prepared in Example 14, and 4 parts of sodium carbonate was added thereto to adjust the pH to 6.4. The aluminum hydroxide produced was deposited on the surface of the pigment particles to thereby effect alumina coating processing. Thereafter, the slurry was washed with water by decantation, filtered and dried in a conventional manner to obtain 150 parts of a reddish, alumina coated lead chromate pigment composition (color index No. 77,600).

COMPARATIVE EXAMPLE 8

189 Parts of a 53 percent by weight aluminum sulfate aqueous solution was added to the starting slurry of molybdate orange prepared in Example 13, and the pH of the slurry was adjusted to 6.0 by adding sodium carbonate. The aluminum hydroxide thus produced was deposited on the surface of the pigment particles to thereby effect alumina coating processing. Thereafter, the slurry was washed with water by decantation, filtered out and dried in a conventional manner to obtain 160 parts of alumina coated molybdate orange (color index No. 77,605).

COMPARATIVE EXAMPLE 9

The alumina coated lead chromate pigment composition prepared in Comparative Example 6 (color index No. 77,603) was pulverized, and 150 parts thereof was dispersed in 1,000 parts of water at room temperature to prepare a uniform slurry.

To this slurry was gradually added 10 parts of sodium silicate and the mixture was stirred for a while, then homogenized. Thereafter, under the same condition and by the same procedure as in Example 11, silica coating processing was conducted.

Thereafter, 22 parts of aluminum sulfate [$Al_2(SO_4)_3 \cdot 18H_2O$] was added to adjust the pH to 6.5 – 7.0. Then, the slurry was washed with water by decantation until sulfate was completely removed, and filtered and dried in a conventional manner to obtain 180 parts of silica and alumina coated lead chromate pigment composition (color index No. 77,603).

COMPARATIVE EXAMPLE 10

150 Parts of powder of alumina coated lead chromate pigment composition prepared in Comparative Example 7 was processed under the same condition and by the same procedure as in Comparative Example 9 to obtain a silica and alumina coated lead chromate slurry (pH being adjusted to 6.5 – 7.0).

Separately, 40 parts of hydrogenated rosin was dissolved in 360 parts of a 1.5 percent by weight aqueous solution of sodium hydroxide, and heated to its boiling point to prepare a rosinated soap solution. The resulting transparent rosinated soap solution was added to the aforesaid pigment slurry and stirred for a while. Then, 1,007 parts of a 13.7 percent by weight aqueous solution of calcium chloride was gradually added to uniformly precipitate or deposit the rosin salt.

Subsequently, the solid phase was separated by filtration and washed with water until the sulfate was completely removed. Upon drying at about 80°C, there was obtained a rosin processed, silica and alumina coated lead chromate pigment composition (color index No. 77,600).

COMPARATIVE EXAMPLE 11

150 Parts of the dried product of the alumina coated molybdate orange pigment composition prepared in Comparative Example 8 was processed in the same manner under the same condition as in Comparative Example 9 to conduct silica coating, whereby there was obtained a silica and alumina coated molybdate orange pigment composition (color index No. 77,605).

Test example:

Resistance tests were conducted by the following procedures on the lead chromate pigment compositions obtained in the Examples and the Comparative Examples.

1. Acid resistance

A coated plate (described hereinafter) was immersed in a 5 percent by weight sulfuric acid solution for 8 hours at 50°C, and the change in hue visually compared with the plate before immersion.

2. Sulfide resistance

A coated plate was immersed in a saturated hydrogen sulfide solution for 1 hour at a room temperature, and estimated as in test 1.

3. Alkali resistance

A coated plate was immersed in an aqueous solution (prepared by adding 2 percent by weight potassium hydroxide to a saturated calcium hydroxide aqueous solution) for 24 hours at room temperature, and estimated as in test 1.

4. Dispersion property

Each pigment was formed into a paint and applied to a glass plate at a thickness of 3 mils by means of an applicater and, after baking at 150°C for 30 minutes, the surface condition was examined.

5. Heat resistance 0.8 percent by weight of pigment was dispersed in a polypropylene resin and allowed to stay in an extruder at 260°C for 10 minutes, and the resulting sample compared with one processed at 200°C for 3 minutes.

6. Increase in viscosity

Each pigment was formed into a paint and placed in a sealed vessel in a definite amount and left for a definite period at 50°C. Then, the viscosity was measured by means of a viscometer to examine the increase in viscosity.

7. Light resistance

A coated plate was irradiated for 500 hours with a Fade-O-Meter and compared with the plate before irradiation.

I. The paint and the coated plate used in tests 1, 2, 4, 6 and 7 were prepared as follows.

8 Parts of pigment and 60 parts of beads were mixed with 12 parts of melamine alkyd resin, and the resulting mixture dispersed for 30 minutes in a paint shaker. Then, the beads were removed by filtration. 5 Parts of thinner was added to the filtrate and applied to a given steel plate by an applicater. After standing for 30 minutes, the assembly was baked at 150°C for 30 minutes to obtain testing samples.

II. Preparation of the sample used in Run No. 3.

0.2 Part of the pigment was added to 10 parts of a water-soluble acryl emulsion (white) and dispersed well therein. This was one-coated on a flexible plate and left for 1 day. The resulting plate was used in the test.

The above-described tests were conducted using the thus prepared testing samples. The samples were rated in terms of 10 grades, wherein a seriously faded or discolored sample was rated 1 while an unchanged sample was rated 10. The results are shown in the following table.

| Run No. | Resisting property | Acid resistance | Sulfide resistance | Alkali resistance | Dispersion property | Heat resistance | Increase in viscosity | Light resistance | Note |
|---|---|---|---|---|---|---|---|---|---|
| 11 | | 9 | 8 | 10 | 9 | 9 | 8 | 8 | CI-77603 ($ZrO_2 + SiO_2$) |
| 12 | | 9 | 9 | 10 | 9 | 10 | 9 | 9 | CI-77600 ($ZrO_2 + SiO_2$) |
| 13 | | 9 | 9 | 10 | 9 | 10 | 9 | 9 | CI-77605 ($ZrO_2 + SiO_2$) |
| 14 | | 9 | 9 | 10 | 9 | 10 | 9 | 9 | CI-77600 ($ZrO_2$ 5% + $SiO_2$) |

Table—Continued

| Run No. | Resisting property | Acid resistance | Sulfide resistance | Alkali resistance | Dispersion property | Heat resistance | Increase in viscosity | Light resistance | Note |
|---|---|---|---|---|---|---|---|---|---|
| Example No. 15 | 9 | 9 | 10 | 9 | 10 | 8 | 9 | CI-77600 ($ZrO_2$ 20% + $SiO_2$) |
| 16 | 9 | 8 | 9 | 9 | 9 | 9 | 8 | CI-77603 Sol was added. |
| 17 | 9 | 9 | 9 | 9 | 10 | 9 | 9 | CI-77605 Sol was added. |
| 18-A | 8 | 9 | 9 | 8 | 10 | 8 | 9 | CI-77600 Water content 5% |
| 18-B | 6 | 7 | 8 | 6 | 9 | 6 | 6 | CI-77600 Water content 30% |
| 18-C | 6 | 7 | 8 | 6 | 9 | 6 | 6 | CI-77600 Water content 90% |
| Comparative Example No. 6 | 4 | 1 | 1 | 9 | 1 | 5 | 1 | CI-77603 $Al_2O_3$ |
| 7 | 3 | 1 | 1 | 9 | 1 | 5 | 2 | CI-77600 $Al_2O_3$ |
| 8 | 2 | 1 | 1 | 9 | 1 | 5 | 2 | CI-77605 $Al_2O_3$ |
| 9 | 7 | 6 | 7 | 6 | 6 | 6 | 5 | CI-77603 $Al_2O_3$ + $SiO_2$ |
| 10 | 7 | 7 | 8 | 8 | 7 | 6 | 8 | CI-77600 $Al_2O_3$ + $SiO_2$ |
| 11 | 7 | 7 | 7 | 7 | 8 | 6 | 8 | CI-77605 $Al_2O_3$ + $SiO_2$ |

As is clear from the above table, the zirconium and silica coated lead chromate pigment composition of the present invention is markedly superior to conventional silica coated or silica and alumina coated pigment compositions in various resisting properties. In the present invention, in order to make it easy to compare the effects of a zirconium and silica coated pigment with a conventional pigment, silica coating processing was conducted so that $SiO_2$ content was not substantially varied. Therefore, in the present invention whether the $SiO_2$ content is small or large, excellent resisting properties are obtained as compared with conventional pigments ones. For example, a zirconium and silica coated lead chromate composition prepared by depositing about 1% by weight of $ZrO_2$ and 3 – 10% by weight of silica thereon shows an excellent resisting property as compared with a conventional pigment.

In addition, it is necessary that the water content of the zirconium processed filtrate be less than about 30 percent by weight. Thus, it can be assumed from the viewpoint of product effects that stronger bonds can be obtained by drying after filtration.

EXAMPLE 19

165.5 Parts of lead nitrate was dissolved in 1500 parts of 18°C water, and 200 parts of a 8.25 percent by weight sodium carbonate aqueous solution was added thereto and the system stirred for 15 minutes. Then, a solution prepared by dissolving 41 parts of sodium dichromate in 1,500 parts of water and adding thereto 17.5 parts of sulfuric acid was added to the lead nitrate solution over about a 30 minute period to react. There was thus obtained a starting slurry of lead chromate.

To this starting slurry was added 3.2 parts of zirconyl sulfate ($ZrOSO_4 \cdot nH_2O$) (calculated as $ZrO_2$) dissolved in 300 parts of water, and a sodium carbonate aqueous solution was further added thereto to adjust the pH of the slurry to about 5.5, thereby conducting zirconium processing.

The filter cake obtained by washing the product of zirconium processing with water by decantation and filtering was redispersed in 1,250 parts of water at room temperature to yield a uniform dispersion. To this slurry there was gradually added 20 parts of sodium silicate ($SiO_2/NaO$ = 3.20 – 3.30, $SiO_2$: 29.0 – 31.0 percent), and the stirring was continued for a while. Then, 24 parts of a 30 percent by weight aqueous solution of antimony trifluoride ($SbF_3$) was added thereto and, after stirring for a while, alkali was added to adjust the pH to about 5.5. Upon washing, filtration and drying, there was obtained 160 parts of a greenish-yellow zirconium and antimony processed pigment (color index No. 77,603).

EXAMPLE 20

149 Parts of lead nitrate was dissolved in 2,000 parts of water and maintained at 40°C. To this solution there was added a solution prepared by dissolving 73 parts of sodium chromate and 1.4 parts of sodium hydroxide in 1800 parts of water to effect reaction. There was thus obtained a starting slurry of lead chromate.

To this starting slurry there was added 2.9 parts (calculated as $ZrO_2$) of a 0.3 percent by weight aqueous solution of zirconyl chloride ($ZrOCl_2 \cdot 8H_2O$) and 4 parts of sodium carbonate was further added thereto to adjust the pH to 6.4, thereby effecting zirconium processing.

The filter cake obtained by washing the slurry with water by decantation and filtrating was redispersed in water and stirred at room temperature until it became uniform.

Then, 15 parts of the aforesaid sodium silicate was gradually added thereto and the stirring continued for a while. To the resulting system there was added 4.8 parts of antimony trioxide ($Sb_2O_3$) dissolved in 5 parts of hydrofluoric acid (1.19 in specific gravity) and the resulting system stirred for a while. Thereafter, the pH was adjusted to about 6.0 by adding alkali.

Upon washing with water by decantation, filtration and drying in a conventional manner, there was obtained 145 parts of a yellow zirconium and antimony processed pigment (color index No. 77,600).

EXAMPLE 21

165.5 Parts of lead nitrate was dissolved in 4,000 parts of water, and a solution prepared by dissolving 50.2 parts of sodium dichromate, 9.6 parts of sulfuric acid and 11.2 parts of sodium molybdate in 2,400 parts of water was added thereto over a 10 minute period and the system stirred for 30 minutes to prepare a starting slurry of molybdate orange.

To this starting slurry there was added 0.8 part (calculated as $ZrO_2$) of a 0.3 percent by weight aqueous solution of zirconyl sulfate ($H.ZrO.OHSO_4.2H_2O$) and sodium carbonate was futher added thereto to adjust the pH of the slurry to 6.0 to effect zirconium coating processing.

Thereafter, the filter cake obtained by washing the slurry with water by decantation and filtrating was redispersed in 1250 parts of water and stirred at a room temperature until the dispersion became uniform.

To this slurry there was then added 20 parts of the aforesaid sodium silicate, and the stirring was continued for a while. There was then added thereto 18 parts of a 30 percent by weight aqueous solution of antimony trifluoride ($SbF_3$) and, after stirring for a while, alkali was added thereto to adjust the pH to about 6.0. Upon washing with water, filtrating and drying in a conventional manner, there was obtained 160 parts of zirconium and antimony processed molybdate orange (color index No. 77,605).

EXAMPLE 22

The zirconium processed filter cake obtained in Example 19 was washed with water and redispersed in 1200 parts of water with stirring at room temperature until the dispersion became uniform. To this slurry there was gradually added the aforesaid sodium silicate, and stirring was continued for a while.

To the resulting system there was added 19.8 parts of a 30 percent by weight aqueous solution of antimony trifluoride ($SbF_3$) and, after stirring for a while, alkali was added thereto to adjust the pH to 6.0.

Upon washing with water by decantation, filtration and drying, there was obtained 145 parts of a reddish zirconium and antimony processed yellow pigment (color index No. 77,600).

EXAMPLE 23

In a manner identical to Example 20, but employing 10 parts of a 30 percent aqueous solution of antimony trifluoride, there was obtained a reddish-yellow zirconium and antimony processed yellow pigment (color index No. 77,600).

EXAMPLE 24

In a manner identical to Example 20, but employing 39 parts of a 30 percent by weight aqueous solution of antimony trifluoride, there was obtained reddish zirconium and antimony processed yellow pigment (color index No. 77,600).

EXAMPLE 25

In a manner identical to Example 20, but employing 48.3 parts of a 30 percent by weight aqueous solution of antimony trifluoride, there was obtained a reddish zirconium and antimony processed yellow pigment (color index No. 77,600).

EXAMPLE 26

In a manner identical to Example 20, but employing a 0.3 percent by weight aqueous solution of zirconyl chloride ($ZrOCl_2.8H_2O$) in an amount of 7.3 parts (calculated as $ZrO_2$), there was obtained a reddish zirconium and antimony processed yellow pigment (color index No. 77,600).

EXAMPLE 27

100 Parts of strontium nitrate was dissolved in 1500 parts of 18°C water, and a solution obtained by dissolving 131 parts of sodium chromate in 1000 parts of water was added thereto over about 1 hour and, after stirring for a while, there was obtained a starting slurry of strontium chromate. To this starting slurry was added a 0.3 percent by weight aqueous solution of zirconyl sulfate ($H.ZrOOH.SO_4.2H_2O$) in an amount of 0.9 part (calculated as $ZrO_2$), and then sodium carbonate was added thereto to adjust the pH to about 7.2. The filter cake obtained by washing the slurry with water by decantation and filtrating was redispersed in 900 parts of water at room temperature until it became uniform.

Thereafter, 7 parts of sodium silicate ($SiO_2/NaO$ = 3.20 – 3.30, $SiO_2$: 29.0 – 31.0%) was gradually added and, after stirring for a while, 9 parts of a 30 percent by weight aqueous solution of antimony trifluoride ($SbF_3$) was added and, after stirring for a while, sodium carbonate was added to adjust the pH to 7.2. Upon washing with water by decantation, filtering and drying in a conventional manner, there was obtained 90 parts of zirconium and antimony processed strontium chromate.

EXAMPLE 28

In a manner identical to Example 21, but employing a 0.3 percent by weight aqueous solution of zirconyl sulfate ($HZrOOHSO_4.2H_2O$) in an amount of 4.5 parts (calculated as $ZrO_2$), there was obtained zirconium and antimony processed strontium chromate.

EXAMPLE 29

100 Parts of barium chloride was dissolved in 1500 parts of 18°C water, and a solution prepared by dissolving 67 parts of sodium chromate in 1000 parts of water was added thereto over about 20 minutes. After stirring for a while, there was obtained a starting slurry of barium chromate. To this was added a 0.3 percent by weight aqueous solution of zirconyl sulfate ($H.ZrOOHSO_4.2H_2O$) in an amount of 1.04 parts (calculated as $ZrO_2$), and the pH of the solution was adjusted to 7.3 with sodium carbonate. The filter cake obtained by washing the slurry with water by decantation and filtering was redispersed in 1000 parts of water and stirred at room temperature until it became uniform.

Thereafter, 10 parts of the aforesaid sodium silicate was gradually added and the stirring was continued for a while. To the resulting system there was added 10.4 parts of a 30 percent by weight aqueous solution of antimony trifluoride (SbF$_3$) and, after stirring for a while, the pH was adjusted to 7.3 with sodium carbonate. Upon washing with water by decantation, filtering and drying, there was obtained 104 parts of zirconium and antimony processed barium chromate.

EXAMPLE 30

In a manner identical to Example 29 but employing a 0.3 percent by weight solution of zirconyl sulfate (HZrOOHSO$_4$.2H$_2$O) in an amount of 5.2 parts (calculated as ZrO$_2$), there was obtained zirconium and antimony processed barium chromate.

COMPARATIVE EXAMPLE 12

To the starting slurry of lead chromate prepared in Example 19 there was added 160 parts of a 6.25 percent by weight aluminum sulfate aqueous solution, and 14 parts of sodium carbonate was further added thereto to adjust the pH to about 5.5. The thus produced aluminum hydroxide was uniformly deposited on the surface of the pigment particles to thereby effect alumina coating processing. Upon washing the slurry with water by decantation, filtering and drying, there was obtained 160 parts of greenish-yellow, alumina coated lead chromate pigment composition (color index No. 77,603).

COMPARATIVE EXAMPLE 13

To the starting slurry of lead chromate prepared in Example 20 there was added 128 parts of a 6.25 percent by weight aluminum sulfate aqueous solution, and sodium carbonate was further added thereto to adjust the pH to about 6.4. The thus produced aluminum hydroxide was uniformly deposited on the surface of the pigment particles to thereby effect alumina coating processing. Upon washing the slurry with water by decantation, filtering and drying, there was obtained 145 parts of a reddish, alumina coated lead chromate pigment composition (color index No. 77,600).

COMPARATIVE EXAMPLE 14

To the starting slurry of molybdate orange prepared in Example 21 was added 160 parts of a 6.25 percent by weight aluminum sulfate aqueous solution, and sodium carbonate was further added thereto to adjust the pH to 6.0. The thus produced aluminum hydroxide was uniformly deposited on the surface of the pigment particles to thereby effect alumina coating processing. Upon washing the slurry with water by decantation, filtering and drying in a conventional manner, there was obtained 160 parts of alumina coated molybdate orange (color index No. 77,605).

COMPARATIVE EXAMPLE 15

The alumina coated, reddish lead chromate pigment (color index No. 77,600) prepared in Comparative Example 13 was used in the form of a washed filter cake (corresponding to 145 parts as a dried material), and subjected to the same antimony processing as in Example 20 to obtain 145 parts of a reddish, aluminum and antimony processed yellow lead chromate composition (color index No. 77,600).

COMPARATIVE EXAMPLE 16

The water-washed filter cake of alumina coated molybdate orange (color index No. 77,605) prepared in Comparative Example 13 was subjected to the same antimony processing as in Example 21 to obtain 160 parts of an aluminum and antimony processed molybdate orange (color index No. 77,605).

COMPARATIVE EXAMPLE 17

100 Parts of strontium nitrate was dissolved in 1500 parts of 18°C water, and a solution prepared by dissolving 131 parts of sodium chromate in 1000 parts of water was added thereto over about 1 hour. The mixture was further stirred for a while, and the pH was adjusted to about 7.2 with sodium carbonate. Upon washing the slurry with water by decantation, filtering and drying in a conventional manner, there was obtained 90 parts of strontium chromate pigment.

COMPARATIVE EXAMPLE 18

100 Parts of barium chloride was dissolved in 1500 parts of 18°C water, and a solution prepared by dissolving 67 parts of sodium chromate in 1000 parts of water was added thereto over about 20 minutes, and, after continuing the stirring, the pH was adjusted to about 7.3 with sodium carbonate. Upon washing with water by decantation, filtering and drying in a conventional manner, there was obtained 104 parts of barium chromate.

COMPARATIVE EXAMPLE 19

In manner identical to Example 20 but employing a 0.3 percent by weight aqueous solution of zirconyl chloride (ZrOCl$_2$.8H$_2$O) in an amount of 29.2 parts (calculated as ZrO$_2$), there was obtained a reddish zirconium and antimony processed yellow pigment (color index No. 77,600).

Test example:

Resistance tests (properties) of the chromate pigments obtained in Examples and Comparative Examples were tested by the following methods.

1. Alkali resistance

4 Grams of the powdery pigment formed in each example was immersed in 20 ml of 5% NaOH for 24 hours (with occasional stirring) and then washed well with water, filtered out and dried. The thus processed powder and the powder before the processing were formed into a paint with lacquor. Both paints were applied to a plate at the same time by means of an applicator in two lines, and the change estimated.

2. Sulfide resistance

A coated plate (described hereinafter) was immersed in a saturated hydrogen sulfide aqueous solution for 1 hour at room temperature, and compared with the same coated plate before immersion.

3. Light resistance

Changes before and after irradiating a coated plate for 100 hours by means of a Fade-O-Meter were estimated.

4. Dispersion property

Each sample was formed into a paint, applied to a glass plate in a thickness of 3 mils by means of an applicater and baked at 150°C for 30 minutes to examine the surface state.

5. Heat resistance 0.8 percent by weight of the pigment was dispersed in a polyethylene resin and kept in an extruder at 230°C for 10 minutes, and the resulting sample was compared with one processed at 180°C for 3 minutes.

The coated plates used in test runs 2, 3 and 4 were produced as follows.

8 Parts of pigment and 60 parts of beads were mixed with 12 parts of melamine alkyd resin, and the resulting mixture was dispersed for 30 minutes by means of a paint shaker. Then, the beads were removed by filtration. 5 Parts of thinner was added to the filtrate and applied to a given steel plate by an applicator. After standing for 30 minutes, the assembly was baked at 150°C for 30 minutes to obtain the testing samples.

The above-described tests were conducted using the thus prepared testing samples. The samples were rated in terms of 10 grades, wherein seriously faded or discolored samples were rated 1 while unchanged samples were rated 10. The results are tabulated below.

| | Run No. | Resisting property Alkali resistance | Sulfide resistance | Light (weather) resistance | Dispersion property | Heat resistance |
|---|---|---|---|---|---|---|
| Example No. | 19 | 9 | 10 | 10 | 10 | 9 |
| | 20 | 9 | 10 | 10 | 10 | 9 |
| | 21 | 10 | 10 | 10 | 10 | 9 |
| | 22 | 9 | 10 | 10 | 10 | 9 |
| | 23 | 8 | 7 | 9 | 10 | 8 |
| | 24 | 9 | 10 | 10 | 9 | 8 |
| | 25 | 8 | 10 | 10 | 9 | 8 |
| | 26 | 8 | 9 | 9 | 10 | 9 |
| | 27 | 9 | 10 | 10 | 10 | 10 |
| | 28 | 8 | 9 | 9 | 10 | 9 |
| | 29 | 9 | 10 | 10 | 10 | 9 |
| | 30 | 9 | 10 | 9 | 10 | 8 |
| Comparative Example No. | 15 | 1 | 1 | 1 | 8 | 1 |
| | 16 | 1 | 1 | 2 | 8 | 2 |
| | 17 | 1 | 1 | 2 | 8 | 2 |
| | 18 | 7 | 5 | 9 | 7 | 6 |
| | 19 | 7 | 5 | 9 | 7 | 6 |
| | 20 | 5 | 8 | 6 | 9 | 7 |
| | 21 | 9 | 8 | 5 | 9 | 6 |
| | 22 | 2 | 5 | 8 | 9 | 8 |

| | Run No. | Resisting property | | Note | |
|---|---|---|---|---|---|
| Example No. | 19 | $ZrOSO_4 \cdot nH_2O$ ($ZrO_2$, 2.0 wt.%) | $SbF_3$ ($SbF_3$, 4.5 wt.%) | | CI No. 77602 |
| | 20 | $ZrOCl_2 \cdot 8H_2O$ ($ZrO_2$, 2.0 wt.%) | $Sb_2O_3$ ($SbF_3$, 4.1 wt.%) | | 77600 |
| | 21 | $HZrOOHSO_4 \cdot 2H_2O$ ($ZrO_2$, 0.5 wt.%) | $SbF_3$ ($SbF_3$, 3.4 wt.%) | | 77605 |
| | 22 | $ZrOCl_2 \cdot 8H_2O$ ($ZrO_2$, 2.0 wt.%) | $SbF_3$ (4.1 wt.%) | '' | 77600 |
| | 23 | '' | (2.0 wt.%) '' | | '' |
| | 24 | '' | (8.0 wt.%) '' | | '' |
| | 25 | '' | (10.0 wt.%) '' | | '' |
| | 26 | $ZrOCl_2 \cdot 8H_2O$ ($ZrO_2$, 5 wt.%) | $SbF_3$ ($SbF_3$, 4.1 wt.%) | | '' |
| | 27 | $HZrOOHSO_4 \cdot 2H_2O$ ($ZrO_2$, 1 wt.%) | $SbF_3$ ($SbF_3$, 3.0 wt.%) | | Strontaium chromate |
| | 28 | ($ZrO_2$, 5 wt.%) '' | '' | | '' |
| | 29 | ($ZrO_2$, 1 wt.%) '' | '' | | Barium chromate |
| | 30 | ($ZrO_2$, 5 wt.%) '' | '' | | '' |
| Comparative Example No. | 15 | $Al_2(SO_4)_3 \cdot 18H_2O$ | — | | CI No. 77603 |
| | 16 | '' | — | | 77600 |
| | 17 | '' | — | | 77605 |
| | 18 | — | $Sb_2O_3$ ($SbF_3$, 4.1 wt.%) | | CI No. 77600 |
| | 19 | — | $Sb_2O_3$ ($SbF_3$, 3.4 wt.%) | | 77605 |
| | 20 | — | — | | Strontium chromate |
| | 21 | — | — | | Barium chromate |
| | 22 | $ZrOCl_2 \cdot 8H_2O$ ($ZrO_2$, 5 wt.%) | $SbF_3$ ($SbF_3$, 4.1 wt.%) | | CI No. 77603 |

While the invention has been described in detail and with reference to specific embodiments thereof, it will be apparent to one skilled in the art that various changes and modifications can be made therein without departing from the spirit and scope thereof.

What is claimed is:

1. A pigment composition comprising chromate particles having deposited thereon a zirconium compound in an amount 0.2–5% by weight (calculated as $ZrO_2$) based on the total amount of chromate particles plus zirconium compound, and also having deposited thereon silica.

2. The pigment composition of claim 1 wherein the silica is amorphous silica, and is present in an amount of from 3 to 40 percent by weight of the chromate particles, zirconium compound and amorphous silica.

3. The pigment composition of claim 2 where the amount of silica is from 10 to 25 percent by weight.

4. The pigment composition as claimed in claim 1 of zirconium and silica coated lead chromate having on the surface of the lead chromate particles 0.2–5 percent by weight, based on the total amount of the composition, of a zirconium compound (calculated as $ZrO_2$) and 3 – 40 percent by weight of amorphous silica.

5. A process for producing a zirconium coated and silica coated chromate pigment composition which comprises: adding a dilute aqueous solution of zirconium salt to an aqueous slurry of chromate pigment particles so that the amount of the zirconium salt is 0.2–5 percent by weight (calculated as $ZrO_2$) based on the total weight of the final zirconium coated chromate pigment composition to deposit the zirconium hydroxide on the surface of the chromate pigment particles, thereafter filtering the zirconium coated chromate pigment composition form the system, dehydrating the zirconium coated chromate pigment composition to strongly bond the zirconium hydroxide to the chromate pigment particles and depositing amorphous silica in an amount of 3 – 40 percent by weight of the zirconium coated chromate pigment composition plus amorphous silica on the zirconium coated chromate pigment composition with the proviso that the amount of zirconium salt deposited is 0.2–5 percent by weight (calculated at $ZrO_2$) based on the total amount of chromate pigment particles, zirconium compound and water-insoluble antimony compound.

6. The process of claim 5 wherein the amorphous silica is deposited from a silica sol system where the silica sol particles have a size of less than 200 m$\mu$ in grain size.

7. The process of claim 6 where the majority of the silica sol particles have a size of 10 – 100 m$\mu$ in grain size.

8. The process of claim 6 wherein silica coating is conducted under an alkaline condition.

9. The process of claim 8 where the pH is 7 – 11.

10. The process producing a zirconium and silica coated lead chromate pigment as claimed in claim 5 which comprises:

a. adding a dilute aqueous solution of a zirconium salt to an aqueous slurry of lead chromate pigment particles in such amount that the resulting zirconium hydroxide content (calculated as $ZrO_2$) will be 0.2–5 percent by weight based on the total amount of the product, to deposit zirconium hydroxide on the surface of said particles;

b. after filtrating the resulting product, subjecting the product to dehydration to obtain a strongly bonded zirconium coated lead chromate;

c. redispersing the resulting pigment in water, adjusting the pH of the resulting slurry to 8 – 10 and, while maintaining the temperature of the slurry above 60°C, adding 3 – 40 percent by weight, based on the total amount of the product, of silica sol (calculated as $SiO_2$) or adding an aqueous solution of alkali silicate to produce an equivalent amount of silica sol, to thereby deposit amorphous silica on the surface of the zirconium coated lead chromate pigment particles.

11. A process for producing a zirconium coated and water-insoluble antimony compound coated chromate pigment composition which comprises: adding a diluted aqueous solution of a zirconium salt to an aqueous slurry of chromate pigment particles so that the amount of the zirconium salt is 0.2–10 percent by weight (calculated at $ZrO_2$) based on the total weight of the final zirconium coated chromate pigment composition to deposit zirconium hydroxide on the surface of the chromate pigment particles, thereafter filtering the zirconium coated chromate pigment composition from the system, removing free water from the filtered product, and thereafter depositing a water-insoluble antimony compound on the zirconium coated chromate pigment composition, with the proviso that the amount of zirconium salt deposited is 0.2–10 percent by weight (calculated as $ZrO_2$) based on the total amount of chromate pigment particles, zirconium compound and water-insoluble antimony compound, and the amount of the water-insoluble antimony compound deposited is 1–10 percent by weight, same basis.

12. The process for producing a zirconium and antimony coated chromate pigment as claimed in claim 11 which comprises adding a dilute aqueous solution of zirconium salt to an aqueous slurry of chromate pigment particles in such amount that the resulting zirconium hydroxide content (calculated as $ZrO_2$) will be 0.2–10 percent by weight, based on the total amount of the product, to deposit zirconium hydroxide on the surface of said particles, and, after filtering the resulting product and redispersing the pigment powder in water, adding an antimony compound in such amount that 1 – 10 percent by weight (calculated as $Sb_2O_3$), based on the total amount of the composition, of a water-insoluble antimony compound is produced, then maintaining the pH at 5 – 8.

13. A pigment composition comprising chromate particles having deposited thereon a zirconium compound in an amount of 0.2 – 10 percent by weight (calculated as $ZrO_2$) based on the total amount of chromate particles plus zirconium compound, and also having deposited thereon a water-insoluble antimony compound.

14. The pigment composition of claim 13 wherein from 1 – 10 percent by weight of water-insoluble antimony compound is present, based on the total weight of chromate particles, zirconium plus water-insoluble antimony compound.

15. The pigment composition of claim 14 where the water-insoluble antimony compound is antimony hydroxide or antimony oxide.

16. The pigment composition of claim 15 where the amount of water-insoluble antimony compound is from 3 to 5% by weight.

17. The pigment composition of claim 14 where the zirconium compound and the water-insoluble antimony compound are coated in a distinct 2-layer form.

18. The pigment composition of claim 14 where the zirconium compound and the water-insoluble antimony compound are present in a mixed state.

19. The pigment composition as claimed in claim 13 of zirconium and antimony coated lead chromate having on the surface of the lead chromate particles 0.2 – 10 percent by weight, based on the total amount of the composition, of a zirconium compound (calculated as $ZrO_2$) and 1 – 10 percent by weight of a water-insoluble antimony compound.

* * * * *